Nov. 29, 1955 A. J. RADCLIFFE, JR 2,725,532

BALANCED JUNCTION DEVICE FOR A TWO-WAY TELEPHONE REPEATER

Filed Dec. 31, 1952

INVENTOR:
ARTHUR J. RADCLIFFE JR.
BY John I. Bellamy
ATTORNEY

United States Patent Office 2,725,532

Patented Nov. 29, 1955

2,725,532

BALANCED JUNCTION DEVICE FOR A TWO-WAY TELEPHONE REPEATER

Arthur J. Radcliffe, Jr., La Grange, Ill., assignor, now by merger, to International Telephone and Telegraph Corporation, a corporation of Maryland Application December 31, 1952, Serial No. 328,915

1 Claim. (Cl. 333—11)

This invention relates to a balanced junction device for a two-way telephone repeater, and its object is to provide a simple and reliable device of this character which permits the desired degree of balance to be obtained economically and readily.

GENERAL DESCRIPTION

The balanced junction device of this invention is of particular utility in a two-way telephone repeater which handles substantially the same frequencies in each of the two directions. These frequencies may, for example, comprise a band extending from 300 to 3000 cycles for a voice-frequency telephone line, or may comprise a higher frequency band for a carrier telephone line. For simplicity, it has been chosen to illustrate and describe the invention as applied to a voice-frequency telephone line. It will be understood, of course, that the signals passing over the line may be for any desired non-telephone use.

In a two-way telephone repeater of the foregoing type, it is common practice to provide two oppositely directed amplifying channels extending between adjacent line sections. A suitable balanced junction device is used at each line section to substantially avoid the signal output of each amplifying channel from effectively reaching the input of the other channel, to thereby avoid the passage through the channels serially of useless and harmful local oscillating currents.

For lines of a common type, any section thereof served by a telephone repeater exhibits (at the repeater terminals) series resistance, shunt resistance, and shunt reactance. For a relatively long section of such a line, the shunt reactance is normally capacitive, but the distant terminal apparatus (for example) may cause the shunt reactance of a relatively short line section to be inductive. An important specific object of the invention is to provide a balanced junction device so arranged that the artificial line associated with a line section exhibiting either a capacitive or an inductive characteristic may be balanced with the artificial line without requiring a precise or finely adjustable capacitor. Adjustable resistors and inductors, which are economical in the sizes required, may thus be used exclusively, thereby avoiding the customary adjustable condenser combinations, which are very expensive in the sizes ordinarily required for the purpose.

In carrying out the foregoing objects of the invention, the junction device employed at either section of a line served by a two-way repeater takes the form of the usual four-point, four-arm Wheatstone bridge, with two of the arms comprising suitable impedance devices (preferably resistive), and with the remaining two arms comprising respectively the concerned line section and a local balance section (or artificial line). The output of one channel is connected across opposite points of the bridge, and the input of the other channel is connected across the other two opposite points. The arms of the bridge may be brought into suitable balance by adjusting resistors in one form, or by adjusting resistors and an inductor in another form, without requiring the adjustment of a capacitor. When the bridge comprising the balanced junction device is so balanced, the two channel connections are mutually conjugate, but each can send to or receive from the associated line section. That is, signals may pass freely between the line section and either channel connection, but passage of a signal from either channel connection to the other is substantially inhibited.

Three embodiments of the improved balanced junction are disclosed as follows:

In the first embodiment, the artificial line comprises the arm of the bridge which is diagonally opposite to the arm formed by the associated line section, whereby a reciprocal relationship exists between these parts, to the end that the capacitive reactance of the line section is balanced by an adjustable inductor in the artificial line.

In the second embodiment, the line section and the artificial line comprise adjacent bridge arms, but the necessity of adjusting the capacitance of the artificial line to balance that of the line section is avoided by a simple slide-arm arrangement for adjusting the relative impedances (resistive as illustrated) of the other two arms to match the relative capacitive reactances of the artificial line and the associated line section.

In the third embodiment, the parts are disposed as in the second embodiment, but a fixed inductor is used in the artificial line to generally balance the inductive reactance which may be exhibited by the previously discussed relatively short line section, the desired precise balance being obtained by the noted slide-arm arrangement.

*The drawings*

Referring now to the drawings.

Figure 4:
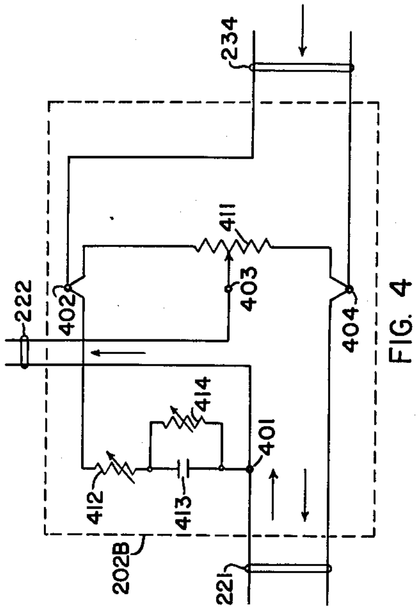
Figure 5:
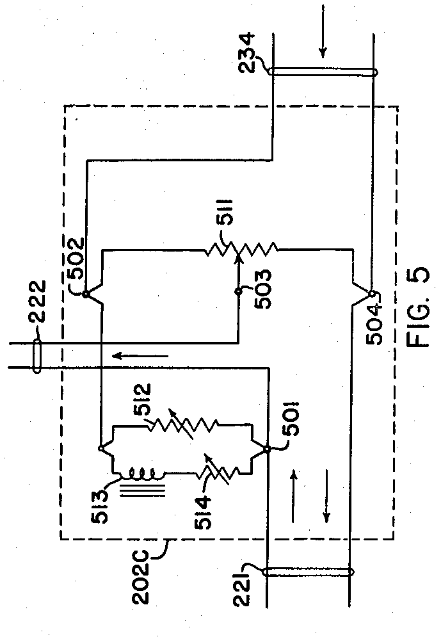
Figure 2:
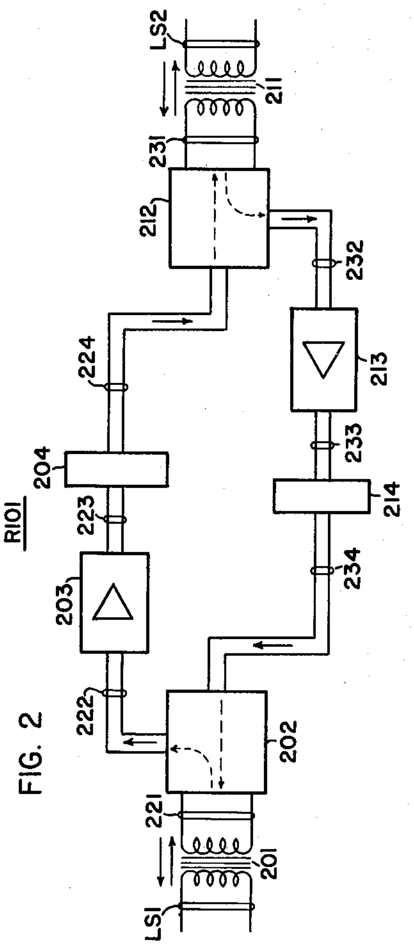
Fig. 2 is a block diagram of one of the repeaters of Fig. 1 showing the external connections to each of two balanced junction devices.
Figure 3:
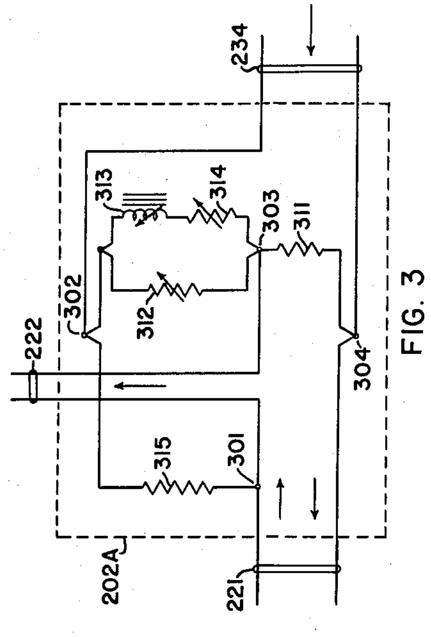

Figs. 3, 4, and 5 are circuit drawings of respective embodiments of the invention as applied to one of the balanced junction devices of Fig. 2.

DETAILED DESCRIPTION

The invention having been described generally, a detailed description will now be given with reference to the drawings.

Figure 1:
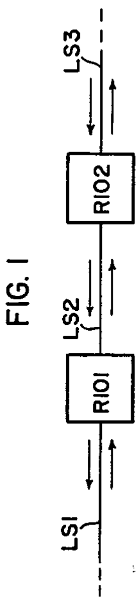
Fig. 1 represents a portion of a long two-way telephone line using telephone-current repeater at suitable intervals to compensate for transmission losses.

*Figs. 1 and 2*

Fig. 1 shows sections LS1 to LS3 of a two-way telephone line of sufficient length to require repeaters such as R101 and R102 to be used at intervals to compensate for transmission losses along the line.

Fig. 2 shows the repeater R101 in block diagram interposed between the line sections LS1 and LS2 of Fig. 1 and connected to the respective line sections through the telephone type repeating coils 201 and 211. Similar balanced junction devices 202 and 212 are connected to the isolating repeating coils 201 and 211 respectively by the pairs of conductors 221 and 231. Connected between the junction devices 202 and 212 are two oppositely directed one-way channels. The left-right channel comprises conductors 222, amplifier 203, conductors 223, band-pass filter 204, and conductors 224. The right-left channel comprises similar elements 232, 213, 233, 214 and 234.

In order to prevent the two amplifying channels of repeater R101 from oscillating, each of the balanced junction devices 202 and 212 is so arranged (as illustrated in Figs. 3 to 5) that signals received from the output conductors, 224 or 234, of either channel are substantially prevented from reaching the input conductors, 232 or 222, of the other channel. For example, signals incoming over line section LS1 reach device 202 by way of repeating coil 201 and conductors 221. Thence, they pass over conductors 222 and amplifier 203, and thus reach device 212, over conductors 224, amplified as desired. The amplified signals take the path in device 212 as indicated by the straight arrow, and thus pass over conductors 231 to line section LS2, but are prevented from reaching the input conductors 232 of the oppositely directed amplifying channel. Similarly, signals incoming from line section LS2 pass through device 212 to the right-left channel for amplification by amplifier 213. The output of amplifier 213 passes through the device 202 to line section LS1, as shown by the straight arrow, but is prevented from reaching input conductors 222 of the left-right channel.

The usual band-pass filters 204 and 214 limit the signals passing through the amplifying channels to frequencies lying within the assigned frequency bank, such as 300 to 3000 cycles, for example. With these filters present, oscillation of the two amplifying channels cannot occur outside the assigned frequency band. Consequently, the junction devices 202 and 212 are not required to be balanced outside of that band.

*First embodiment—Fig. 3*

Fig. 3 shows at 202A a circuit diagram of the first embodiment of the invention as applied to the balanced junction device 202 of Fig. 2. The pairs of conductors 221, 222, and 234 of Fig. 2 are shown in the same relative location in Fig. 3.

The device 202A comprises a four-point, four-arm Wheatstone bridge. The four terminal points 301 to 304 comprise two pairs of opposite terminal points, being upper and lower points 302, and 304, and left and right points 301, 303. The bridge has four arms connected between adjacent ones of these terminal points, comprising upper and lower left arms, and upper and lower right arms.

The upper left arm is comprised of resistor 315 connected between terminals 301 and 302; the lower left arm is formed by the line section LS1, as represented by conductor pair 221 connected across terminal points 301, 304; the lower right arm is formed by the resistor 311, connected between terminal points 303 and 304; and the upper right arm is a compound arm connected between terminals 302 and 303, and comprising the artificial line, or balancing network, balanced against the line section represented by conductors 221. This upper right balance arm is formed by the resistor 312, in parallel with the serially connected inductor 313 and resistor 314. Connected to one pair of opposite terminal points, 301 and 303, is the conductor pair 222, being the input conductors of the left-right channel of Fig. 2, while connected to the second pair of opposite terminal points, 302 and 304, is the conductor pair 334, being the output conductors of the right-left channel of Fig. 2.

Regardless of whether or not the bridge arrangement of device 202A of Fig. 3 is in a condition of balance, a signal incoming from line section LS1 by way of conductor pair 221 is impressed across conductors 234 by way of resistor 315, and is impressed across conductors 222 by way of resistor 311. The signals thus impressed on conductors 234 have no adverse effect as these conductors represent the output end of the one-way right-left channel, and the signals thus impressed on conductors 222 pass, as is desired, through the left-right channel of Fig. 2, being amplified at 203. Thus, a balanced condition of device 202A is not essential in regard to signals incoming thereto over conductors 221.

Also, regardless of whether or not the bridge of Fig. 2 is balanced, a signal arriving thereat over conductors 234

(the output end of the right-left channel) is passed through resistor 315 and over conductors 221 to reach the line section LS1 of Fig. 2, but, unless the bridge 202A is balanced, a corresponding portion of such a signal is impressed across points 301 and 303 to reach conductor pair 222 (the input end of the oppositely directed left-right amplifying channel), which is an undesired result as hereinbefore explained. But, when the bridge is in a balanced condition, a signal incoming over conductor pair 234 to reach conductor pair 221 does not reach input conductors 222 of the oppositely directed channel, because terminal points 301 and 303 then have the same potential impressed thereon by the signal current and thus have zero potential across them.

Considering current flow from conductors 234 and through terminal points 302 and 304, the desired balanced condition of bridge 202A (lack of consequent potential difference between points 301 and 303) is achieved when the ratio of voltage drops across the upper and lower left arms is equal to the ratio of voltage drops across the upper and lower right arms. This is true because the voltage drops across the two upper arms are then equal to each other, and the voltage drops across the two lower arms are likewise equal to each other. This desired condition obtains, whatever the specific impedances of the arms, so long as the impedances to the current flow in question of the upper and lower left arms are in the same ratio as the impedances of the upper and lower right arms, that is, if UL/LL equals UR/LR, where UL, LL, UR, and LR represent the respective impedances of the upper-left, lower-left, upper-right, and lower-right arms. The lower-left arm is the line section LS1 of Fig. 2, as seen from conductors 221, which are connected thereto through repeating coil 201. Since the impedance LL of this arm is a variable according to the characteristics of the particular line section (LS1) to which the left end of the repeater R101 is connected, its variations must be offset by a compensating adjustment of at least one other arm of the bridge of Fig. 3. This compensating adjustment may be made by suitably adjusting the impedance UR of the upper right arm, with the remaining arms (upper-left and lower-right) having chosen fixed impedances UL and LR (such as, for example 600 ohms each), offered by fixed resistors 315 and 311. Since the effective impedance LL of the concerned line section appears in the denominator of one ratio (UL/LL) and the impedance UR appears in the numerator of the equal ratio UR/LR, the two variable impedances LL and UR consequently bear an inverse relationship. For example, to maintain the ratios equal where UL and LR are fixed, an increase in the value of the denominator impedance LL must be offset by a proportional decrease in the value of the numerator impedance UR, and a decrease in LL requires a proportionate increase in UR.

The foregoing would clearly apply to all frequencies of signal current if all four arms exhibited only resistive impedance (such as do arms 315 and 311), but the lower-left arm, which represented by conductors 221, is assumed to exhibit a net capacitive impedance resulting from the usual distributed line capacity. If this be assumed for the moment to be its only exhibited impedance and if the upper right arm is considered for the moment to exhibit only a suitable inductive impedance (as with device 313 suitably adjusted and connected directly between points 302 and 303, with resistors 312 and 314 omitted), then the equation is balanced at any selected frequency, as well as at any higher or lower frequency. For example, at a higher frequency, the capacitive reactance LL is lower, but the inductive reactance UR is proportionately higher, thereby maintaining the balance. Also, while the capacitive reactance LL is higher at a lower frequency, the inductive reactance is proportionately lower, thereby maintaining the desired balance.

It may nevertheless appear on a first examination of the foregoing discussion that the terminal points 301 and 303 will not both be at the same potential throughout a cycle of signal current, the current is leading the voltage in the left side of the bridge and in lagging the voltage in the right side of the bridge. These two time-displaced current effects, however, have been found to be, and can be mathematically demonstrated as being, mutually canceling. Considering the lower-left and lower-right arms, for example, the voltage drop across the capacitive lower left arm lags so much behind the leading current in the capacitive left side of the bridge that it lags behind the main voltage (across points 302 and 304) to the same degree that the current in the inductive right side of the bridge lags behind the main voltage. Since the voltage drop across the resistive lower right arm is in phase with the lagging current through the right side of the bridge, it is in phase with the lagging voltage drop across the lower left arm. Similarly, the voltage drop across the inductive upper right arm leads the lagging current through the right side of the bridge sufficiently that it is in phase with the leading current through (and the consequent voltage drop across) the resistive upper left arm of the bridge. That is, with the bridge in balance as assumed the voltage drop across either reactive arm is directly in phase with the voltage drop across the resistive element in series with the other reactive arm.

Inductive device 313 is variable, as by being provided with an adjustable magnetic core, to enable the inductance thereof to be adjusted according to the capacity appearing across conductors 221 when coupled to a line section.

In practice, a capacitive line section LS1, in addition to its capacitive effect, exhibits series and shunt resistances. Series and shunt resistive devices 314 and 312 are the inverse balancing elements for balancing respectively the shunt and the series resistance of the line section as they appear at conductors 221. Devices 312 and 314 are adjustable for this purpose.

It may here be pointed out that the output terminals 301 and 303 may be used as the input terminals, with terminals 302 and 304 being used as the output terminals, for these two sets of terminals are mutually conjugate when the bridge is balanced as set forth.

The band-pass filters 204 and 214 (Fig. 2) are useful here, as in conventional balanced junction arrangements, because of the practical limitations imposed by the necessity for representing counterparts of distributed line impedances by lumped-impedance devices 312 to 314.

*Second embodiment—Fig. 4*

Fig. 4 shows at 202B a circuit diagram of the second embodiment of the invention as applied to the balanced junction device 202 of Fig. 2.

Device 202B is also in the form of a four-point, four-arm Wheatstone bridge, with the four terminal points 401 to 404 corresponding respectively to points 301 to 304, Fig. 3.

The device 202B as arranged with the balancing impedance in an arm of the bridge adjacent to the associated line section (conductor pair 221) minimizes the possibility of unbalance due to misadjustment of phase characteristics.

The operation of device 202B is in general the same as device 202A (Fig. 3) hereinbefore described in the first embodiment of the invention. Device 202B differs in that the elements comprising the upper-left and upper-right arms of the bridge have been transposed. That is the balancing impedance, or artificial line, which includes the variable resistor 412, fixed capacitor 413 and variable resistor 414, replaces resistor 315 (Fig. 3) in the upper left arm of the bridge and a resistive element, included in potentiometer 411, replaces the artificial line (Fig. 3) in the upper-right arm of the bridge.

To obtain preliminary balance, the balancing impedance is adjusted to have substantially the same phase characteristics as the associated line section (over conductors 221), which thereby results in an impedance proportional to the line impedance, wherein the proportion is governed by the ratio of the reactance of the fixed capacitor 413 and the reactance of the capacity exhibited by the line section The desired balance as previously described is attained by the adjustment of potentiometer 411 so that a substantially zero voltage exists between terminals 401 and 403.

The two sets of one-way channel connections are also mutually conjugate as set forth in the previous description.

*Third embodiment—Fig. 5*

Fig. 5 shows at 202C a circuit diagram of the third embodiment of the invention as applied to the balanced junction device 202 of Fig. 2.

Device 202C is also in the form of a four-point four-arm Wheatstone bridge, wherein the terminal points 501 to 504 correspond respectively to points 401 to 404 (Fig. 4) and differs from device 202B in the character and arrangement of the elements comprising the artificial line.

The device 202C is used with line of such nature as to exhibit inductive characteristics resulting from associated equipment or length of the line.

The inductive character of the artificial line is determined by fixed inductor 513 and the associated variable resistors 512 and 514. The variable resistors 512 and 514 are adjusted to give phase characteristics similar to the associated line section (conductors 221) and therefore provide a preliminary balance adjustment. The final condition of balance is obtained by the adjustment of the potentiometer as hereinbefore discussed.

Device 202C also provides the mutually conjugate connections (conductor pair 222 and 234) as set forth in the first embodiment.

I claim:

In a balanced junction device for connecting a two-way alternating-current signal-transmission line with a one-way signal-input line and with a one-way signal-output line while maintaining the output line effectively disconnected from the input line, said device including a series of four terminals and including a series of three local arms each connecting a separate one of the first three terminals to the next succeeding one, said two-way line comprising a fourth arm connecting the fourth terminal to the first, said input line comprising a first diagonal bridge connected between the first and third terminals, said output line comprising a second diagonal bridge connected between the second and fourth terminals, said two-way line exhibiting a capacitive reactance in shunt of the transmission path thereover, whereby the fourth arm of the bridge offers a shunt capacitive impedance varying inversely with frequency, said two-way line also exhibiting resistive impedances respectively in series with and in shunt of the transmission path thereover, whereby the fourth arm of the bridge also offers series and shunt resistive impedance, the second arm including an inductive impedance device, wherefore it exhibits an inductive impedance which varies directly with frequency, the first and third arms each exhibiting substantially only resistive impedance, wherefore each offers an impedance which is substantially independent of frequency, the second arm also including a series-connected and a shunt-connected resistive device respectively in series with and in shunt of the inductive impedance device, wherefore it also offers series and shunt resistive impedances, means for adjusting said series-connected resistive device to effect a first component of balance of the bridge wherein the resistive impedance of the series-connected resistive device balances the shunt resistive impedance offered by the fourth arm, means for adjusting said shunt-connected resistive device to effect a second component of balance wherein the impedance of the shunt-connected resistive device balances the series resistive impedance offered by the fourth arm, and means for adjusting the inductance of the said inductive impedance device to effect a third component of balance wherein the inductive impedance of the third arm balances the capacitive impedance offered by the fourth arm, said three components of balance, when effected, bringing the bridge into a state of balance, wherein said adjusted resistive devices in the second arm compensate for respective resistive impedances of the fourth arm, and wherein the adjusted inductive impedance of the second arm at a selected frequency bears the same ratio to the resistive impedance of the first arm as the resistive impedance of the third arm bears to the capacitive impedance of the fourth arm, the adjusted state of balance remaining for higher and lower frequencies, in that the inverse variations with frequency in the value of the fourth-arm impedance in the second said ratio is compensated for by the direct variations with freqeuncy in the value of the second-arm impedance in the first said ratio.

whereby application to the first and third terminals of the bridge of a signal voltage over the input line of any said frequency applies the same potential to the second bridge terminal as to the fourth, and consequently creates no potential difference between the conductors of the output line.

References Cited in the file of this patent

UNITED STATES PATENTS

| | | |
|---|---|---|
| 1,432,354 | Nottage | Oct. 17, 1922 |
| 1,815,254 | Hoyt | July 21, 1931 |
| 2,463,379 | Harding | Mar. 1, 1949 |
| 2,629,024 | Edwards | Feb. 17, 1953 |

FOREIGN PATENTS

| | | |
|---|---|---|
| 158,536 | Great Britain | Mar. 23, 1922 |

OTHER REFERENCES

Catalog K, Section III, on "Bridges," published 1939. by General Radio Co. Cambridge, Mass.